United States Patent
Brinks et al.

(10) Patent No.: US 7,017,884 B2
(45) Date of Patent: Mar. 28, 2006

(54) FLUID METERING VALVE

(75) Inventors: Barry T. Brinks, Fort Collins, CO (US); Dana Nova Joyce Wolverton, Fort Collins, CO (US); Delbert Dwight Cannon, Greeley, CO (US); Gary F. McDaniel, Fort Collins, CO (US)

(73) Assignee: Woodward Governor Company, Fort Collins, CO (US)

( * ) Notice: Subject to any disclaimer, the term of this patent is extended or adjusted under 35 U.S.C. 154(b) by 223 days.

(21) Appl. No.: 10/754,467

(22) Filed: Jan. 8, 2004

(65) Prior Publication Data

US 2005/0151102 A1    Jul. 14, 2005

(51) Int. Cl.
*F16K 31/02* (2006.01)

(52) U.S. Cl. .................. 251/129.11; 251/129.19; 251/284; 123/568.24

(58) Field of Classification Search ............ 251/77, 251/284, 129.11, 129.12, 129.13, 129.19; 123/568.23, 568.24
See application file for complete search history.

(56) References Cited

U.S. PATENT DOCUMENTS

| | | | | |
|---|---|---|---|---|
| 3,557,762 A | * | 1/1971 | Mitchell | 123/337 |
| 3,981,284 A | * | 9/1976 | Gospodar | 123/568.23 |
| 4,318,530 A | * | 3/1982 | Lissmyr et al. | 251/77 |
| 4,549,446 A | * | 10/1985 | Beeson | 251/129.03 |
| 5,937,835 A | * | 8/1999 | Turner et al. | 251/129.13 |
| 5,941,500 A | * | 8/1999 | Lebkuchner | 251/77 |
| 6,102,016 A | * | 8/2000 | Sitar et al. | 251/129.13 |
| 6,382,195 B1 | * | 5/2002 | Green et al. | 123/568.23 |

\* cited by examiner

*Primary Examiner*—John Bastianelli
(74) *Attorney, Agent, or Firm*—Reinhart Boerner Van Deuren P.C.

(57) ABSTRACT

A fluid metering valve includes a gear rack which is slidable on a valve stem in which a spring counteracts the force of an actuator to maintain a constant load on the gear mechanism to prevent backlash. Corresponding stop mechanisms between the gear and the shaft of a rotary actuator come into engagement with each other near a fully closed position of the fluid metering valve for zero calibration purposes upon power loss to the actuator. A single valve member and a single actuator of the fluid metering valve provides for both a shut-off function and a metering function.

26 Claims, 8 Drawing Sheets

FLUID METERING VALVE

FIELD OF THE INVENTION

The present invention relates generally to fluid metering valves and more particularly relates to gear mechanisms and/or shutoff mechanisms for fluid metering valves.

BACKGROUND OF THE INVENTION

There are a wide variety of different types of applications where fluid metering valves are used for controlling the flow rate of gas or liquid in a fluid system, such as in an engine. One application where there is anticipated to be a significant need is fluid metering valves for controlling the flow rate of natural gas and air into various fuel cell prime movers. Fuel cell technology is currently very promising. In fuel cell applications, there is a need for a highly accurate and low cost fluid metering system to control the flow rate of natural gas and air into various fuel cell prime movers. Other such applications outside the fuel cell technology may also benefit from such a highly accurate and low cost fluid metering system. The present invention is directed at providing technological advances over the existing state of the art as it relates to fluid metering valves or other such valves.

BRIEF SUMMARY OF THE INVENTION

The present invention has several different aspects, as set forth by the claims appended hereto.

One aspect of the present invention is directed toward a new gear arrangement in the valve assembly. The valve assembly includes a valve housing defining a flow passageway and a valve member arranged along the flow passageway for regulating fluid flow therethrough. A valve stem extends from the valve member and a stop is integrally provided along the valve stem. The novel gear mechanism includes an input gear slidably disposed on the valve stem for movement toward and away from the stop provided along the valve stem. An actuator has an output on an output gear that acts upon the input gear to drive the valve member.

With regard to this first aspect, a novel operation may be provided. In particular, the valve assembly may be arranged such that when the actuator drives the output gear in a first direction, the input gear engages the stop along the valve stem and thereby drives the valve member in the first direction. However, when the actuator drives the output gear in a second direction, the actuator may not necessarily drive the valve member due to the slidable disposition of the input gear on the valve stem.

Another aspect of the present invention is directed toward a fluid metering valve assembly for integrally shutting off and metering fluid flow in response to an electrical demand input. Thus, both shutoff and metering functions can be performed by a single valve. According to this aspect, the fluid metering valve assembly includes a valve housing including a fluid inlet, a metered fluid outlet, a flow passageway between the metered flow outlet and the fluid inlet, and a valve seat disposed along the flow passageway. A valve member is disposed along the flow passageway and is moveable toward and away from the valve seat. An electrical actuator moves the valve between a fully closed position in which the valve member is seated against the valve seat and an open position in which the valve member is spaced from the valve seat. An elastomeric seal between the valve member and a valve seat when the valve is in the fully closed position provides a seal and prevents fluid flow from the inlet to the metered flow outlet, thereby enabling a shutoff function. The electrical actuator positions the valve member in a predetermined position in response to a demand input to set a fluid flow rate of fluid through the metered flow output thereby enabling a metering function in the same valve.

With respect to this aspect, and according to one of the embodiments of the present invention, two separate valve portions may be provided along the valve stem including a closure portion and a metering portion. According to this embodiment, the valve housing further includes a nozzle section in spaced relation to the valve seat which provides a restriction orifice in combination with the metering portion in order to meter fluid flow. The closure portion seals against the valve seat to prevent flow portion through the nozzle section. Thus, a single actuator is effectively controlling the size of two different restrictions provided by two different valve plugging portions along a valve in the valve assembly.

An additional aspect of the present invention is directed toward a mechanism for stopping the valve assembly at or near the fully closed position. According to this aspect, the valve assembly also includes a valve housing defining a flow passageway and a valve member arranged along the flow passageway for regulating flow therethrough. A valve stem similarly extends from the valve member. Between an actuator which provides an output on a motor shaft and the valve stem is a gear assembly comprising an output gear, a sector gear, and an input gear which acts upon the valve stem. The sector gear is rotatable relative to a pivot and has a first gear section engaging the output gear (thereby being driven by the motor) and a second gear section engaging the input gear. A first stop structure is provided integral with the shaft of the actuator and a second stop structure is provided integral with the sector gear. The first and second stop structures engage each other at a position proximate a fully closed position of the valve member. One application and/or advantage of this design is that it may be used to establish a home position in the event of power loss to the actuator. In an embodiment and application, spring and/or fluid forces would tend to fully close the valve which could in turn want to cause the system to over rotate and thereby could prevent the establishment of a home position or reference point upon reestablishing power. By having a known predetermined home position, by virtue of the first and second stop structures, the potential adverse effects of power loss are eliminated or otherwise minimized.

Other aspects, objectives and advantages of the invention will become more apparent from the following detailed description when taken in conjunction with the accompanying drawings.

While the invention will be described in connection with certain preferred embodiments, there is no intent to limit it to those embodiments. On the contrary, the intent is to cover all alternatives, modifications and equivalents as included within the spirit and scope of the invention as defined by the appended claims.

DETAILED DESCRIPTION OF THE INVENTION

Figure 1:
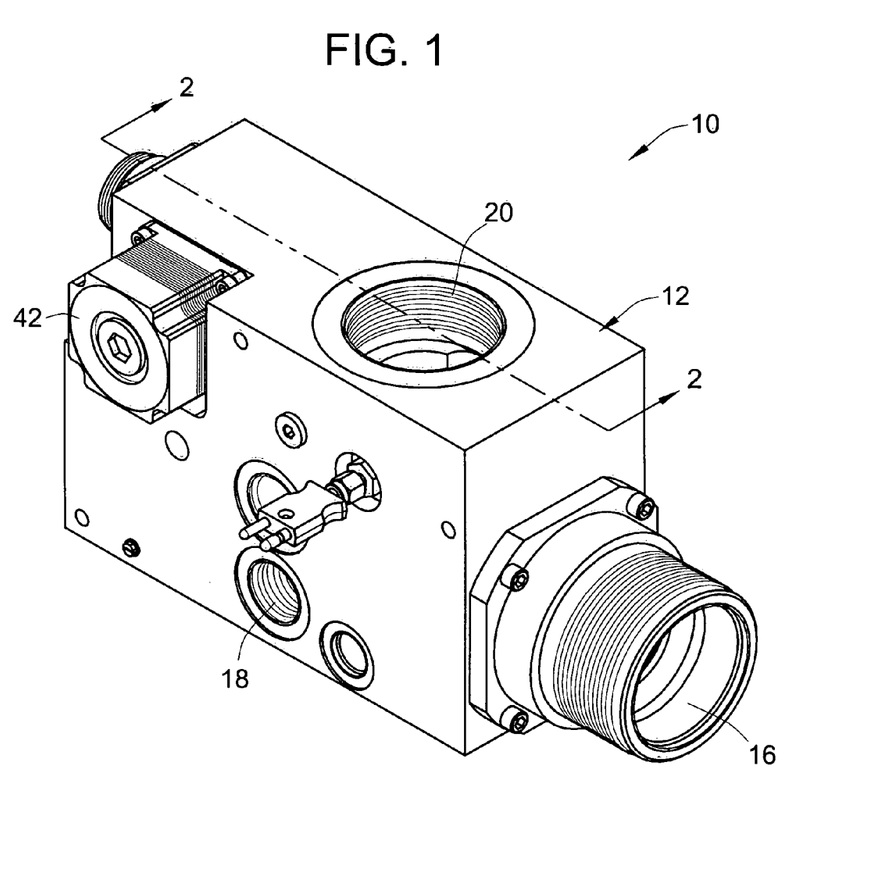
FIG. 1 is an isometric view of a gas metering and shutoff valve with stepper motor actuation in accordance with the first embodiment of the present invention.
Figure 2:
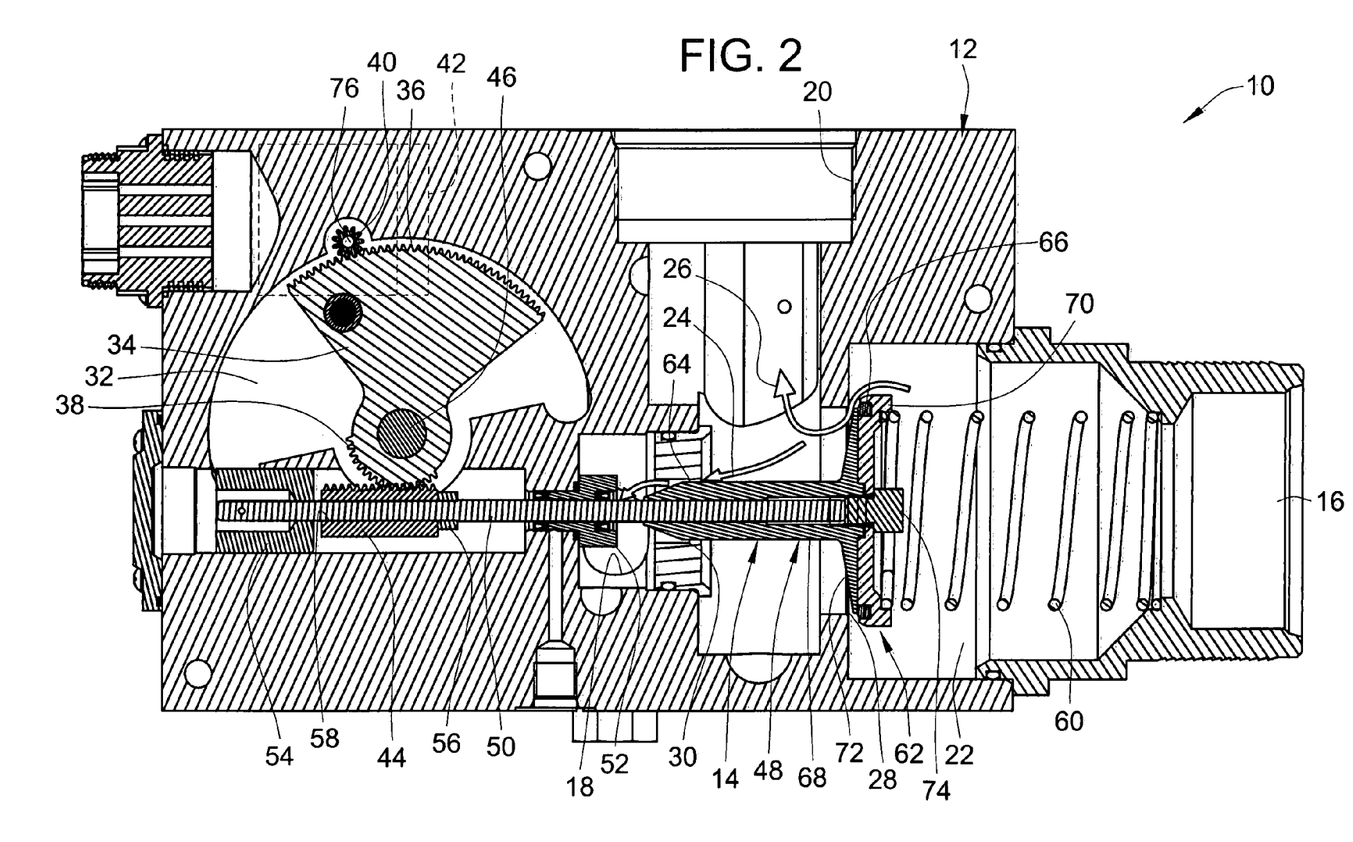
FIG. 2 is a cross-section of the valve assembly shown in FIG. 1 taken about line 2—2.

Referring to FIGS. 1 and 2, an embodiment of a fluid metering valve assembly 10 is shown in accordance with a first embodiment of the present invention. The valve assembly 10 generally includes a valve housing 12 that provides for various ports and passageways and which also slidably supports a movable valve member 14 therein. In the first embodiment, the valve housing 12 provides an inlet port 16 for receiving fluid and two outlet ports including a metered flow outlet port 18 and a main flow or unmetered flow outlet port 20. Between and among the various ports 16, 18 and 20, there is provided an internal flow passageway 22 to provide a first flow path 24 from the inlet port 16 to the metered flow outlet port 18 and a second flow path 26 from the inlet port 16 to the unmetered flow outlet port 20.

Along the flow passageway 22, the valve housing 12 also provides a valve seat 28 fluidically between the inlet port 16 and each of the outlet ports 18 and 20, and a metering nozzle 30. The metering nozzle 30 may be machined into the valve body or a separate component collar part affixed and sealed relative to the valve body as shown. The valve seat 28 and the metering nozzle 30 are arranged in linear spaced relation and are generally concentric and coaxial with each other. The metering nozzle 30 is disposed between the inlet port and the metered flow outlet port 18 and assists in providing a predetermined sized orifice used for metering flow to the metered flow outlet port 18.

The valve housing 12 also provides for a gear chamber 32 to facilitate gear mounting and thereby actuation of the valve member 14. Mounted within the gear chamber 32 is a sector gear 34 which is pivotably mounted to the valve housing 12 by a pivot pin 46. The sector gear 34 pivots about an axis generally perpendicular to the linear stroke movement of the valve member 14. The sector gear 34 includes one gear face 36 that is meshed with a pinion output gear 40 that is driven by a stepper motor 42, and another gear face 38 generally spaced 180° apart from the first gear face 36. The second gear face 38 is meshed with a corresponding gear face of an input gear rack 44 which acts upon the valve member 14. With the input side gear face 36 being spaced a farther distance away from the pivot pin 46 than the output gear face 38, the sector gear 34 effectively also acts as a speed reducer and thereby amplifies the stepper motor force exerted on the valve member 44 during actuation.

The valve member 14 is slidably disposed for linear reciprocation in the valve housing 12, in the preferred embodiment shown. However, it should be appreciated that the invention could also have application to rotary-type valves with the same concepts being used herein. Thus certain appended broader claims hereto are meant to cover such rotary valve possibilities. The valve member 14 may be comprised of one single part or different assembled component parts as is shown.

The valve member generally includes a valve plug member 48 and a valve stem 50 slidably inserted into the valve plug member 48. The valve stem 50 extends from the plug member 48 generally toward the gear chamber 32 and through a pair of spaced apart linear guide bearings 52. The guide bearings 52, 54 are mounted into the valve body of the valve housing 12 and provide cylindrical guide surfaces generally concentric with the valve seat 28 and metering nozzle 30. The guide bearings 52, 54 slidably engage the valve stem 50 to provide for smooth linear reciprocating movement of the valve member 14. The guide bearing 52 that is disposed between the flow passageway 22 and the gear chamber 32 preferably includes various static and dynamic seals (not numbered) to prevent fluid leakage therebetween.

Along the valve stem 50 there is provided a stop in the form of an enlarged diameter stop shoulder 56 along the valve stem. The shoulder 56 may be integrally formed unitary with the stem 50 or provided by a collar attached or axially abutted to a shoulder on the stem. The gear rack 44 is slidably disposed on the valve stem 50 and freely movable relative to the valve stem 50, but normally has one end abutted up against the stop shoulder 56 between the two guide bearings 52, 54. Specifically, the gear rack 44 includes a central cylindrical bore that slidably receives the valve stem 50 therethrough. In this manner, the stepper motor is only operable to axially drive the valve member 14 toward the open position, through abutting engagement between the stop shoulder 46 and the gear rack 44.

However, when the stepper motor 42 moves toward the closed position, there is no corresponding stop or abutment surface along the opposite side of the valve stem 50 and therefore the stepper motor alone 42 is not operable to close the valve member 14. Instead, a spring 60 supported by the valve housing 12 acts upon the valve member 14 to urge the valve member 14 toward the closed position (in addition or in the alternative, fluid pressure may be used for effectuating a closing or counteracting force). Thus, when the stepper motor moves in the opposite direction, it allows the valve member 14 to move toward a closed position under the action of a spring. However, the spring 60 can only close the valve member 14 as far as the stepper motor 42 will allow, such that the stepper motor 42 still effectively controls the position of the valve member 14 relative to the valve housing.

It is an advantage of this arrangement that backlash in the valve member is provided in that there is a constant spring load force applied to keep the valve member 14, the gear rack 44, the sector gear 34, and the output gear 40 in a constant state of loaded engagement. This minimizes or eliminates slop or backlash and resulting inaccuracies. Thus, an advantage of this arrangement is that improved accuracy and a reduction or elimination of backlash or slop in the movement is provided.

Figure 6:
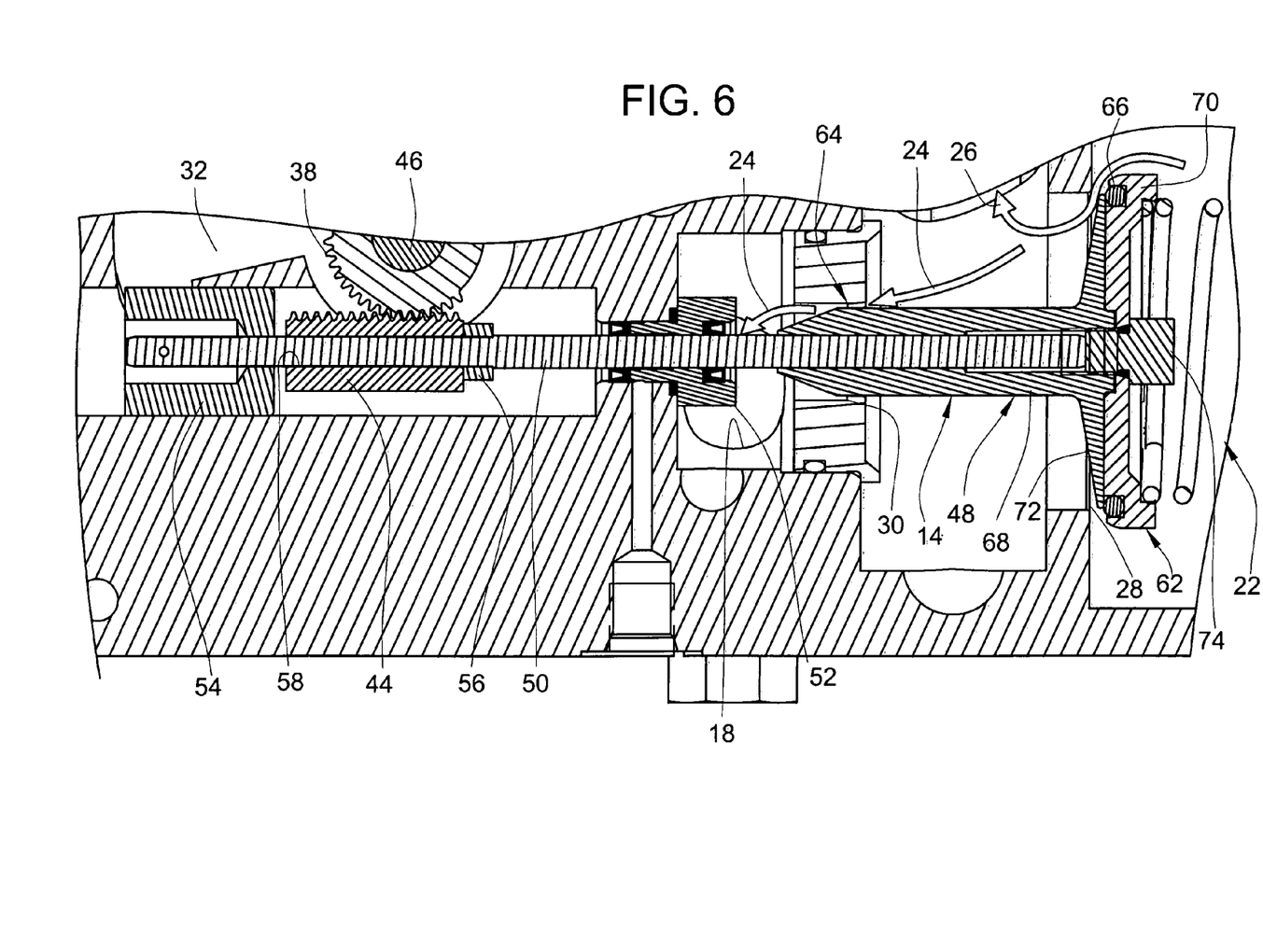
FIG. 6 is an enlarged view of a portion of the cross-section of FIG. 2 to better illustrate the valve details of the first embodiment.

Another advantage of the disclosed embodiment is the fact that both a shutoff function and a metering function are enabled by a single valve member 14. In particular, the valve plug member 48 includes a closure portion 62 that forms a first restriction orifice with the valve seat 28 and a metering portion 64 that forms a metering orifice with the metering nozzle 30 for flow. The metering portion 64 may be sized smaller than the central hole through the metering nozzle 30 such that contact never occurs therebetween (alternatively it may be arranged such that there is always an axial gap between the two even in the fully closed position).

In contrast, the closure portion 62 is sized and positioned to axially engage the valve seat 28 in the fully closed position. To enable a shutoff function, a shutoff seal 66 is compressed between the closure portion 62 and the valve seat 28 when the valve is positioned in the fully closed position. The shutoff seal 66 may be mounted to the closure portion 62 as shown. One way of mounting the shutoff seal 66 is by providing a multiple piece assembly including a sleeve segment 68 and a closure plate portion 70 which provides an annular groove that houses the seal 66 which is partially covered by a radially extending disk portion 72 of the valve sleeve segment 68. The two components can be secured together by a threaded fastener 74 as shown. The sleeve segment 68 and threaded fastener 74 can be held against the valve stem 60 otherwise integrally secured to the valve stem 50.

The shutoff seal 66 may be configured so as to provide a seal when the valve member 14 is in the fully closed position and full engagement occurs between the closure portion 62 and the valve seat 28 under the action of the closure spring 60.

Another advantage of the present invention is that a single actuator which is shown in the form of a stepper motor 42 can be used to provide control over both metering functions and shutoff functions. Typically, conventional metering valve applications comprise a separate shutoff valve which is actuated by a first actuator and a separate metering valve which is actuated by a separate second actuator. In contrast in the disclosed embodiments, by providing both shutoff and metering functions along a single valve member which has position controlled by the stepper motor 42, these functions can be enabled with a single actuator. Further, a known predetermined spring force 60 can be used to simultaneously maintain load on the gearing systems keeping a bias in the gear system in one direction while at the same time being used to provide a sufficient closing force on the valve member 14 to sufficiently compress the shutoff seal 66 to prevent fluid leakage.

Turning to the particular actuator which is shown in the form of the stepper motor 42, it should first be stated that other appropriate types of actuators that can provide reliable accurate control with sufficient speed might also be used. However, the stepper motor 42 has certain advantages with the valve assembly shown. In the disclosed embodiment, the stepper motor 42 is mounted along the outside of the valve housing 12 and includes a motor shaft 76 along which the pinion type output gear 40 is provided.

Another novel feature of the present invention is the provision of corresponding stop structures between the sector gear 34 and the stepper motor 42 which establish a predetermined known home position for the valve assembly to allow a rezero calibration of the open loop stepper motor position upon power loss to the stepper motor 42. These corresponding stop structures may include a collar 78 for the stepper motor that is mounted and securely affixed to the motor shaft 76. A resilient engagement lever 80 is fastened or otherwise provided on the stop collar 78 and extends therefrom into the gear chamber 32. As shown generally in FIGS. 3, 4 and 5, there is sufficient clearance between the valve housing 12 and the stop collar 78 and resilient lever 80 such that no interference occurs therebetween during operation such that the motor shaft 76 can freely rotate relative to the valve housing 12. However, on the sector gear 34 there is provided a stop boss which may take various forms, but in the disclosed embodiment comprises a shoulder bolt 82 mounted through a hole 84 formed through the sector gear 34. The shoulder bolt 82 is not screwed into the hole 84, but sufficient clearance is provided therebetween with elastomeric grommets 86 inserted into the clearance space to provide for shock absorption. The threaded end of the shoulder bolt 82 is secured by a fastener such as a nut 83 which abuts up against one side of the sector gear 34.

Figure 3:
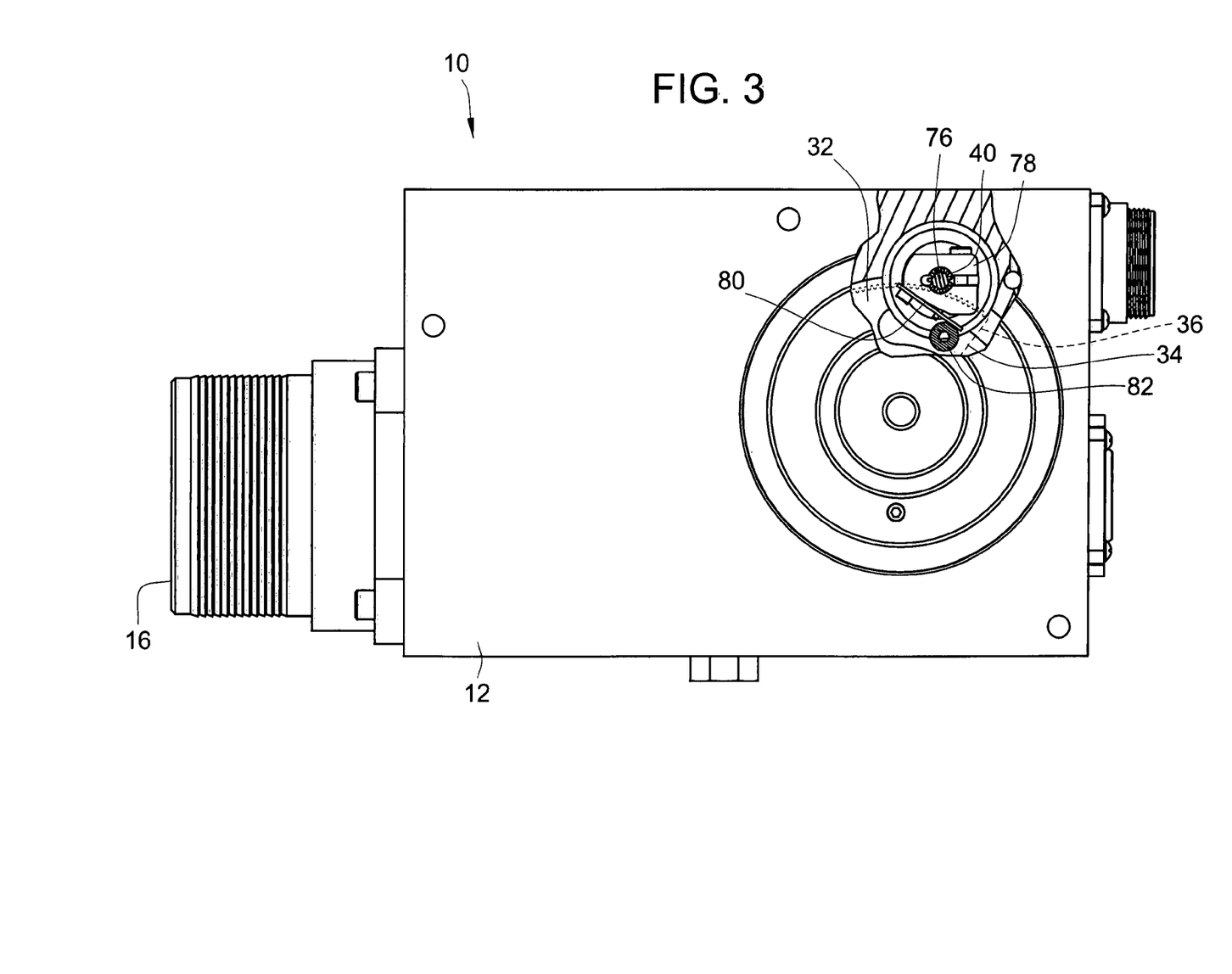
FIG. 3 is the cutaway backside view of the valve assembly shown in FIG. 1 to better illustrate the stop mechanism between the stepper motor and the sector gear.
Figure 4:
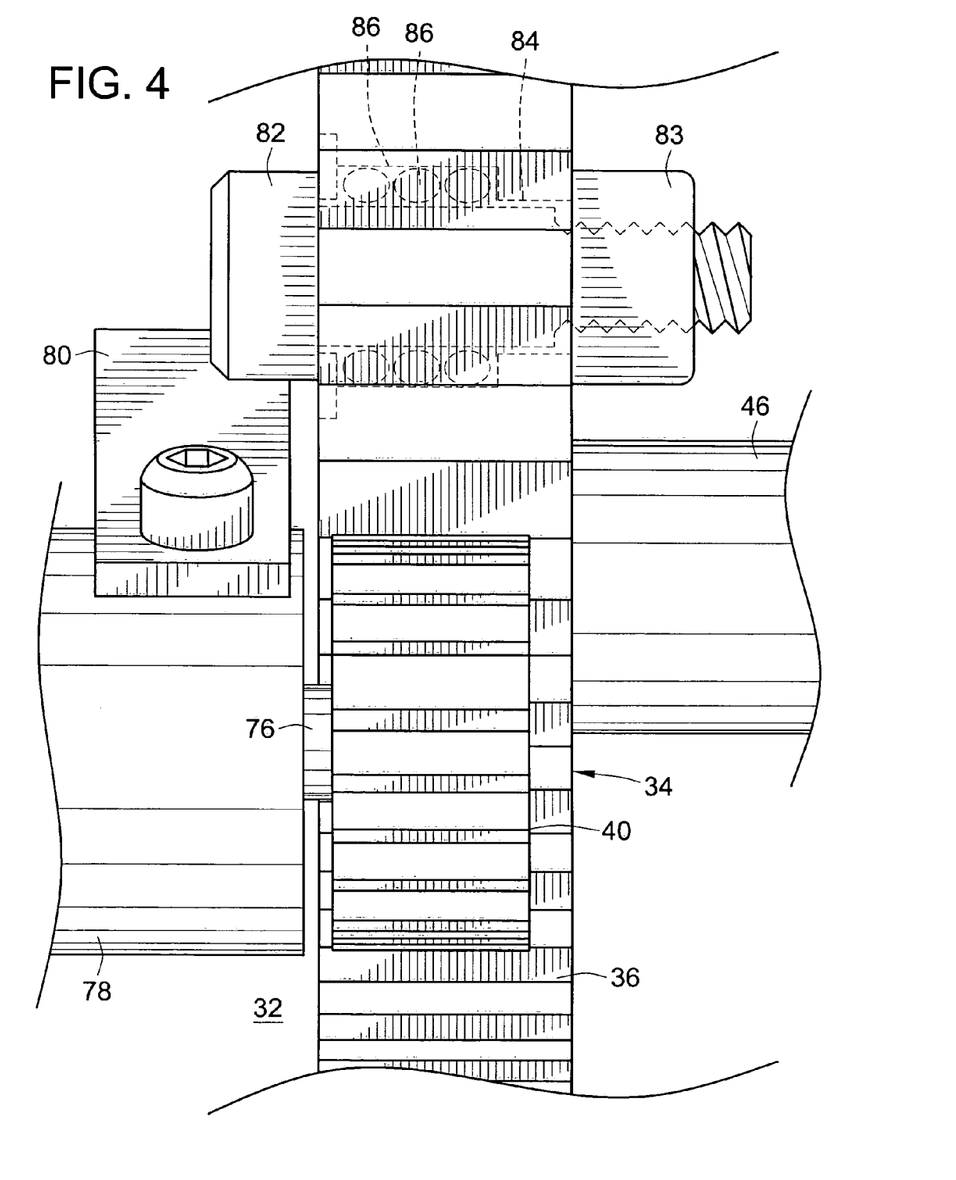
FIG. 4 is a top cutaway view of the valve assembly shown in FIG. 1 also to better illustrate the associated stop mechanism.
Figure 5:
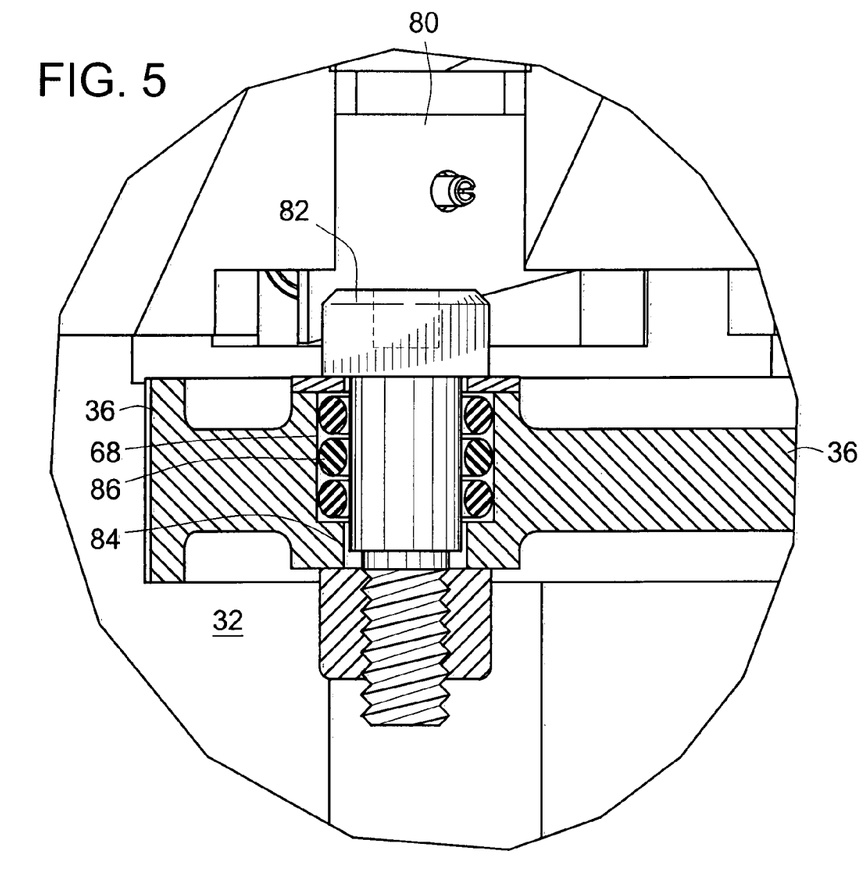
FIG. 5 is a bottom cutaway view of the valve assembly shown in FIG. 1 also providing details about the stop mechanism.

Along the other side of the sector gear 34 is provided the head of the shoulder bolt 82 which acts as the boss structure and is positioned such that when the valve member 14 is at or near the fully closed position, the head of the shoulder bolt 82 engages the resilient lever 80 to prevent over rotation of the stepper motor 42 upon the loss of power and thereby establish a home position for open loop rezero calibration. The corresponding stop structures between the sector gear 34 and the stepper motor 42 thus ensure that upon reaching the fully closed position, movement of the gear assemblage is stopped and over rotation is prevented.

In the event of power loss, the spring 60 will drive the valve member 14 to the fully closed position since the stepper motor 42 no longer provides resistance. Under high spring and/or fluid pressures, this can cause the valve member to move to the fully closed position very fast generating momentum. With engagement between the shoulder bolt 82 and the resilient lever 80 upon reaching the fully closed position (e.g. directly at and/or slightly before or after), any momentum in the valve member which would tend to over rotate the gear assemblage and drive the stepper motor 42 to an unknown position is prevented. The energy is dissipated by virtue of the resiliency provided through the lever 80 and the grommets 86 such that shock forces and potential damage to components are also avoided. Upon reconstitution of electrical power to the stepper motor 42, a known zero fully closed position is established and therefore additional feedback or closed loop control over the valve is not needed. The stepper motor 42 can thus position the valve member in a predetermined position in response to an electrical demand input to set a fluid flow rate through the metered flow outlet port 18 (and thereby also establish a rough flow rate through the unmetered flow outlet port 20). New demand inputs can be sent to the stepper motor 42 to change the position of the valve between multiple discreet positions between fully opened and fully closed positions, thereby providing for different flow rates through the valve assembly 10.

Figure 7:
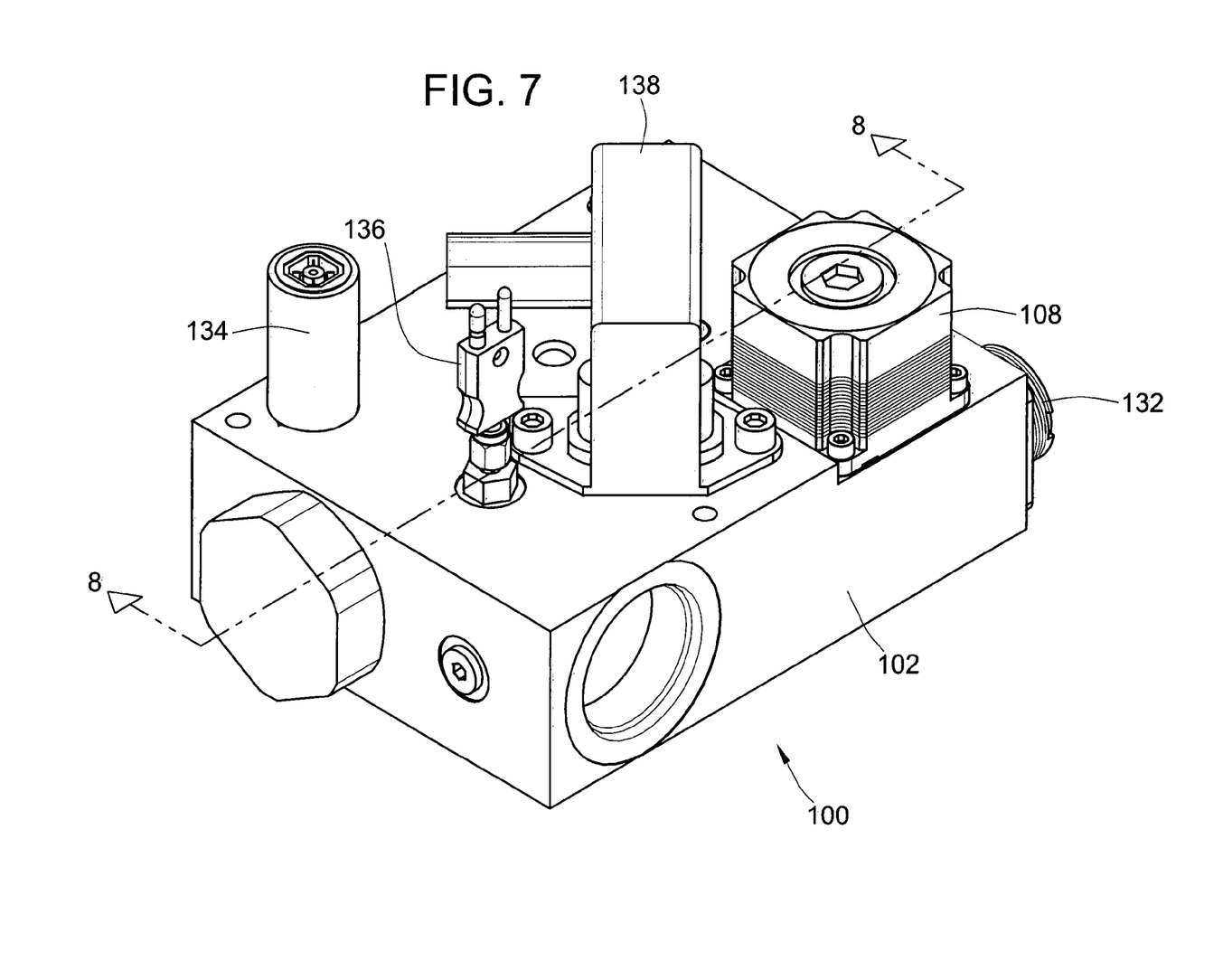
FIG. 7 is an isometric view of a valve assembly according to a second embodiment of the present invention in which both shutoff and metering functions are provided by a single valve portion.
Figure 8:
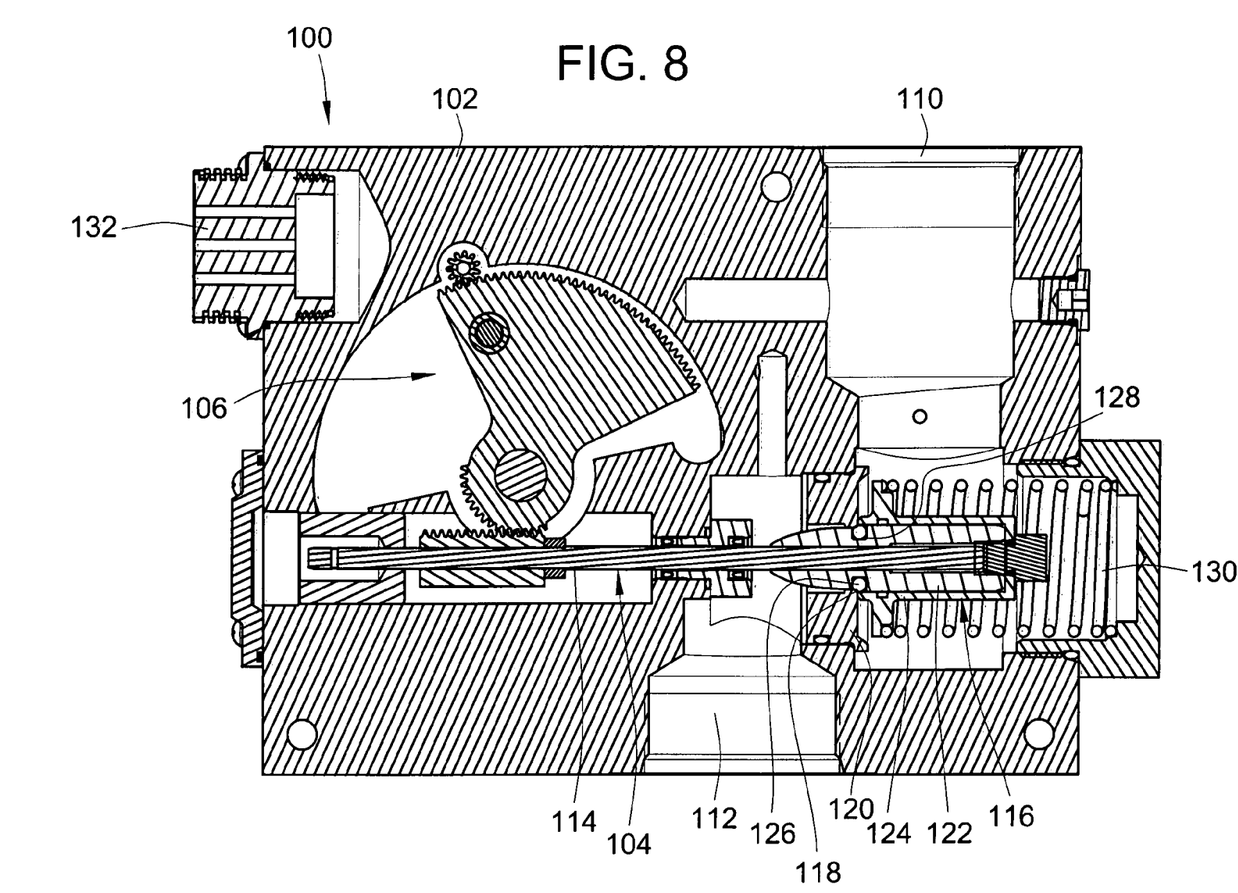
FIG. 8 is a cross-section of the valve assembly shown in FIG. 7 taken about line 8—8.

The second embodiment of the present invention is illustrated in FIGS. 7 and 8 which incorporate many of the aspects and features as those shown for the first embodiment. Because this will readily be understood from one skilled in the art, attention will be directed primarily toward the distinguishing characteristics which relate to the particular construction of the valve member and porting arrangement in this embodiment. Referring to FIGS. 7 and 8, there is shown a valve assembly 100 with a valve housing 102 and a valve plug member 116. There is also provided a gear assembly 106 and a stepper motor or other appropriate actuator which may be identical or similar to that of the first embodiment illustrated in FIGS. 1–6.

In this embodiment however, the valve housing only includes a single inlet port 110 and a single metered flow outlet port 112. A valve member similarly includes a valve stem 114 and a valve plug member 116. However, in this embodiment, the valve seat 118 is provided by a metering nozzle 120 to integrally provide both shutoff and metering functions at one single location. The valve plug member 116 may include an inner sleeve 122 which is positioned by the valve stem to provide a metering orifice relative to the metering nozzle 120. The valve plug member 116 may also include an outer sleeve 124 over the inner sleeve 122 that traps an O-ring gasket 126 arranged in an annular groove 128 provided around the inner sleeve 122. A spring 130 supported by a portion of the valve housing 102 engages the valve plug member 116 to urge the valve member 104 toward the fully closed position, which is when the plug member 116 engages the valve seat 118 and compresses the O-ring gasket 126 between the plug member 116 and the metering nozzle 120.

The plug member 116 can be axially spaced from the metering nozzle 120 by driving the stepper motor 108 similar to the first embodiment in response to a demand electrical input received at electrical connector 132. The valve plug member includes the tapering portion of the inner sleeve 122 over the linear stroking movement of the valve to provide a gradually diminishing size of a metering orifice relative to the metering nozzle, and thereby establishes a metered flow of fuel from the inlet port 110 to the outlet port 112. At the same time, the spring 130 is operable to move the valve member 104 to the fully closed position and thereby provide a seal therebetween and prevent fluid flow from the inlet port 110 to the outlet port 112. Thus, both metering and shutoff functions are similarly enabled with a single valve member and also a single actuator in this second embodiment as well.

Various types of sensors can be employed on the valve assemblies of either embodiment and the metering valve assembly 10 or 110 may be either used for metering gas or liquid. One exemplary application is in fuel cell applications for controlling the flow rate of natural gas and/or air into various fuel cell prime movers. In such applications, various sensors may be employed such as various fluid pressure and temperature sensors. For example, in the illustrated second embodiment, an absolute pressure sensor 134 is arranged to measure fluid pressure upstream of the nozzle, a temperature sensor 136 is arranged to measure upstream temperature, and a differential pressure sensor 138 is arranged to measure the pressure differential across the metering valve nozzle. Similarly, sensors are used or may be used in the first embodiment or other such embodiments of the invention.

All references, including publications, patent applications, and patents, cited herein are hereby incorporated by reference to the same extent as if each reference were individually and specifically indicated to be incorporated by reference and were set forth in its entirety herein.

The use of the terms "a" and "an" and "the" and similar referents in the context of describing the invention (especially in the context of the following claims) is to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. No language in the specification should be construed as indicating any non-claimed element as essential to the practice of the invention.

Preferred embodiments of this invention are described herein, including the best mode known to the inventors for carrying out the invention. Variations of those preferred embodiments may become apparent to those of ordinary skill in the art upon reading the foregoing description. The inventors expect skilled artisans to employ such variations as appropriate, and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

What is claimed is:

1. A valve assembly comprising:
   a valve housing defining a flow passageway;
   a valve member arranged along the flow passageway for regulating flow therethrough, a valve stem extending from the valve member, a stop being provided along the valve stem;
   an input gear slidably disposed on the valve stem toward and away from the stop; and
   an actuator driving an output gear that acts upon the input gear, wherein when the actuator drives the output gear in a first direction, the input gear engages the stop and drives the valve member in said first direction, and wherein when the actuator drives the output gear in a second direction the actuator does not drive the valve member.

2. The valve assembly of claim 1, further comprising a spring urging the valve member in said second direction.

3. The valve assembly of claim 2, wherein the spring biases the valve member toward a valve seat, the valve member closing the flow passageway when seated against the valve seat.

4. The valve assembly of claim 3, wherein when the valve member is against the valve seat, movement of the actuator in said second direction causes the input gear to slide on the valve stem away from the valve seat.

5. The valve assembly of claim 4, wherein the spring maintains the stop on the valve stem in continuous contact with the input gear when the valve passageway is open to prevent backlash.

6. The valve assembly of claim 5, wherein said actuator is a stepper motor having a plurality of incremental positions.

7. The valve assembly of claim 6, wherein the valve member has a linear reciprocating stroke in the housing.

8. The valve assembly of claim 7, wherein the input gear is a valve rack interposed between first and second bearings integral with the housing, the first and second bearings guiding and supporting the linear reciprocating stroke of the valve member.

9. The valve assembly of claim 8, further comprising a sector gear rotatable about a pivot, the stepper motor acting through the sector gear upon the valve rack, the sector gear being configured as a speed reducer to increase force applied to the valve member.

10. The valve assembly of claim 9, further comprising a collar secured to a shaft of the stepper motor, a stop lever extending from the collar and engaging a stop boss on sector gear proximate a fully closed position of the valve member.

11. The valve assembly of claim 10, wherein the stop boss comprises a fastener mounted in a hole in the sector gear with radial clearance therebetween, and at least one resilient grommet in the radial clearance providing shock absorbance when the stop lever engages the stop boss.

12. The valve assembly of claim 10, wherein upon electrical power loss, a spring urges the valve member to the fully closed position causing engagement between the stop boss and the stop lever and thereby establishing a home position for the stepper motor and thereby a predetermined reference position reestablishment of electrical power.

13. The valve assembly of claim 1, wherein the valve assembly is for integrally shutting off and metering fluid flow in response to an electrical demand input, the valve housing including a fluid inlet, a metered fluid outlet, and a valve seat disposed along the flow passageway, the flow passageway between the metered flow outlet and the fluid inlet, the valve member disposed along the flow passageway movable toward and away from the valve seat, the actuator being an electrical actuator moving the valve member between a fully closed position in which the valve member is seated against the valve seat and open positions in which the valve member is spaced from the valve seat, the valve assembly further comprising:

an elastomeric seal between the valve member and the valve seat in the fully closed position sealing and preventing fluid flow from the inlet to the metered flow outlet, whereby a shutoff function is enabled; and wherein the electrical actuator positions the valve member in a predetermined position in response to the demand input to set a fluid flow rate through the metered flow outlet, whereby a metering function is enabled.

14. The valve assembly of claim 13, wherein the valve member integrally includes a stem portion, a closure portion and a metering portion, and wherein the housing further includes a nozzle section in space relation to the valve seat, wherein the metering portion forms a restriction orifice with the nozzle section to meter fluid flow, the closure portion sealing against the valve seat to prevent flow through the nozzle section.

15. The valve assembly of claim 14, wherein the valve housing further includes an unmetered flow outlet downstream of the closure portion, and wherein the metering portion meters fluid flow through the metered outlet.

16. The valve assembly of claim 13, wherein the valve seat integrally provides a nozzle section, wherein the valve member meters flow between the valve member and the valve seat.

17. The valve assembly of claim 13, wherein the elastomeric seal is mounted to the valve member.

18. The valve assembly of claim 13, wherein the elastomeric seal provides a shutoff seal in the fully closed position.

19. The valve assembly of claim 13, wherein the valve assembly is arranged on the fuel system of an internal combustion engine or a fuel cell for metering fuel flow.

20. The valve assembly of claim 13, wherein the electrical motor is a stepper motor.

21. The valve assembly of claim 1, wherein the input gear acts upon the valve stem, the actuator having an output on a motor shaft, the output gear integral with the motor shaft, the valve assembly further comprising:

a sector gear rotatable about a pivot having a first gear section engaging the output gear and a second gear section engaging the input gear;

a first stop structure integral with the shaft of the actuator;

a second stop structure integral with the sector gear; and wherein the first and second stop structures engage each at a position proximate a fully closed position of the valve member.

22. The valve assembly of claim 21, further comprising resilient means for absorbing shock during engagement of the first and second stop structures.

23. The valve assembly of claim 21, wherein the first stop structure includes a collar secured to a shaft and a stop lever extending from the collar, and wherein the second stop structure includes a stop boss projecting from the sector gear.

24. The valve assembly of claim 23, wherein the stop boss comprises a fastener mounted in a hole in the sector gear with radial clearance therebetween, and at least one resilient grommet in the radial clearance providing shock absorbance when the stop lever engages the stop boss.

25. The valve assembly of claim 21, wherein upon electrical power loss, a spring urges the valve member to the fully closed position causing engagement between the stop boss and the stop lever and thereby establishing a home position for the actuator and thereby a predetermined reference position reestablishment of electrical power.

26. The valve assembly of claim 25, wherein the actuator is a stepper motor.

* * * * *